United States Patent
Johns

[11] 3,762,163
[45] Oct. 2, 1973

[54] BYPASS FOR CATALYTIC REACTOR
[75] Inventor: Paul A. Johns, Grass Lake, Mich.
[73] Assignee: Tenneco Inc., Racine, Wis.
[22] Filed: June 8, 1972
[21] Appl. No.: 260,764

[52] U.S. Cl. .................... 60/277, 23/288 F, 60/288
[51] Int. Cl. ................................................ F01n 3/14
[58] Field of Search .......................... 60/277, 288; 23/288 F

[56] References Cited
UNITED STATES PATENTS
3,083,084  3/1963  Raymond .............................. 60/277
3,094,394  6/1963  Innes ..................................... 60/277
3,214,246  10/1965  Ridgway .............................. 60/288
3,220,805  11/1965  Fowler .................................. 60/277

Primary Examiner—Douglas Hart
Attorney—J. King Harness et al.

[57] ABSTRACT

A catalytic exhaust system for an internal combustion engine has an emergency reactor by pass circuit that includes a blow-out wall located in the gas passage on the upstream side of the reactor and which blows out in response to the destruction of an explosive charge which is energized by closing of a thermal switch that senses the temperature inside the reactor.

9 Claims, 6 Drawing Figures

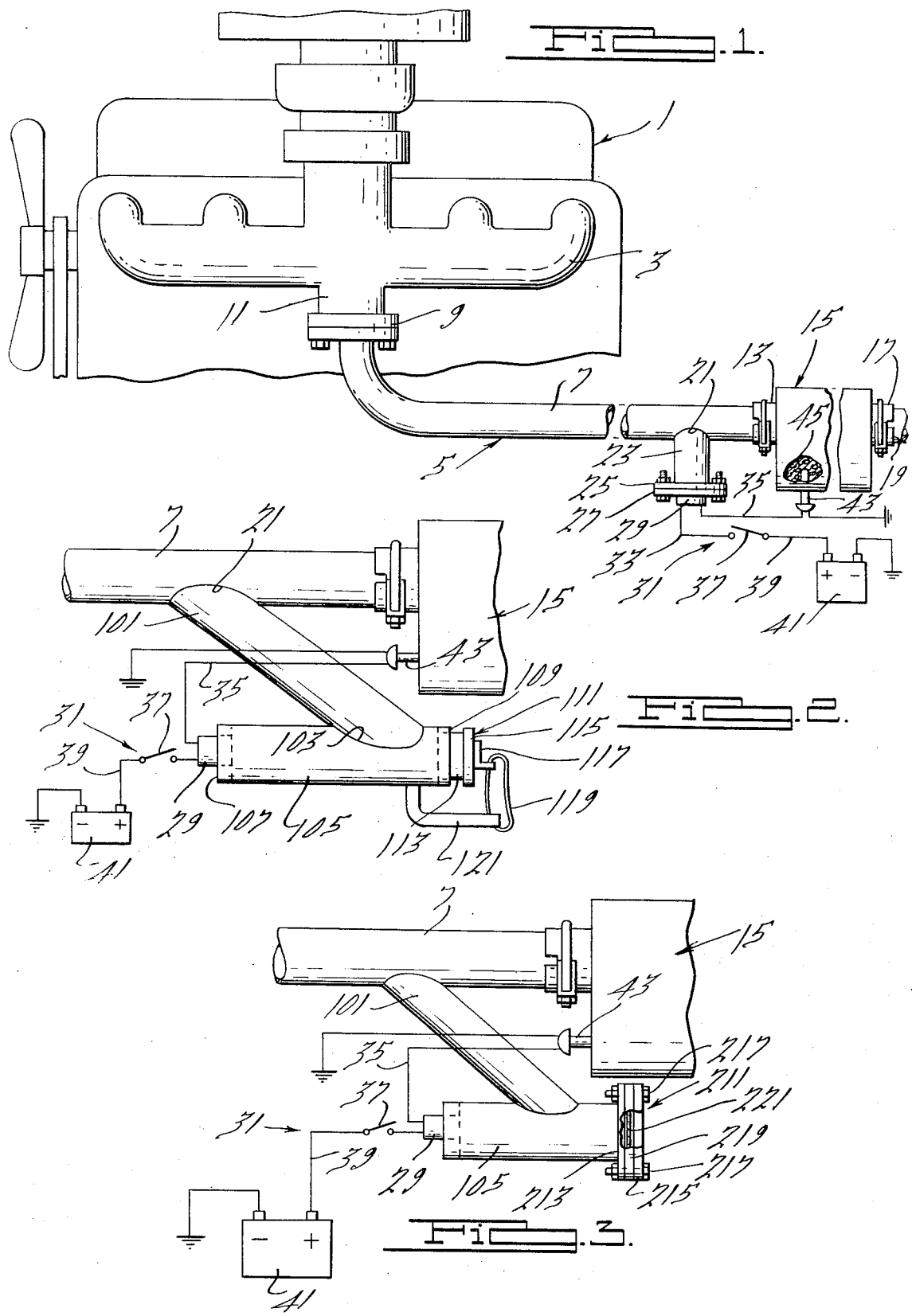

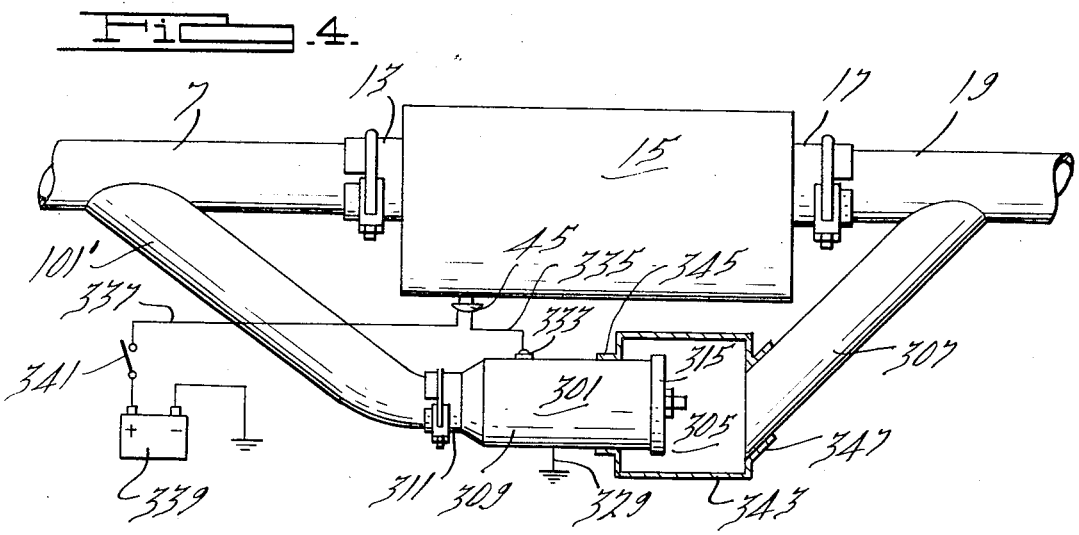
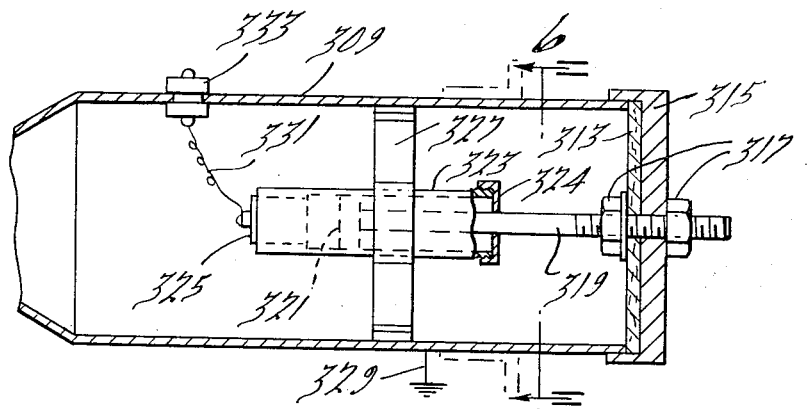
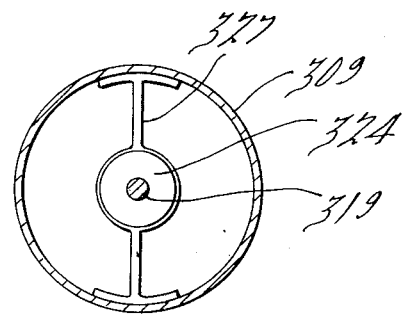

BYPASS FOR CATALYTIC REACTOR

BRIEF SUMMARY OF THE INVENTION

It is the purpose of the invention to provide a means for exhaust gas to by pass the reactor in a catalytic exhaust system in the event that the temperature of the reactor exceeds a predetermined value.

The invention accomplishes this purpose by means of an explosively operated blow-out wall in the gas passage that is energized by overtemperature actuated closing of a thermal switch inserted in the reactor.

DESCRIPTION OF THE DRAWINGS

FIG. 1 is a schematic view, partly broken away, of an internal combustion engine with a catalytic exhaust system embodying the invention;

FIG. 2 is a fragmentary view of a modified form of by pass arrangement that may be used in the system of FIG. 1;

FIG. 3 is a fragmentary view of another modified form of by pass arrangement that may be used in the system of FIG. 1;

FIG. 4 is a side view of a third modified form of bypass arrangement;

FIG. 5 is a sectional detail of a portion of FIG. 4;

FIG. 6 is a sectional view taken along line 6—6 in FIG. 5.

DETAILED DESCRIPTION OF THE INVENTION

An internal combustion engine 1 has an exhaust manifold 3 that discharges exhaust gas into a catalytic exhaust system 5 that includes an exhaust pipe 7 which is connected at 9 to the manifold outlet 11. The pipe 7 delivers gas to the inlet bushing 13 of a catalytic reacotr 15 and treated gas passes via outlet bushing 17 into the tailpipe 19 to flow to atmosphere.

In accordance with this invention, the wall of pipe 7 has an opening 21 to enable gas to flow into a by pass pipe 23 that is welded to pipe 7 around the opening. the end of pipe 23 carries an attachment flange 25 to which is bolted a cover 27 that closes the end of the pipe. The cover has a threaded or press fit plug 29 that contains an electrically detonated explosive charge so that upon explosion and consequent self-destruction thereof, the end of pipe 23 will be open to atmosphere to permit gas in inlet pipe 7 to by pass the reactor 15.

Explosion of plug 29 is energized and controlled by an electrical circuit 31 which includes a pair of electrical conduits 33 and 35 operatively connected to the plug. The line 33 runs to a manual switch 37, preferably the ignition switch of the engine electrical system, and the other side of switch 37 connects via electrical conduit 39 with the grounded battery 41. The line 35 runs to one side of a grounded thermal switch 43 that projects into the catalyst bed 45 in reactor 15 to sense its temperature.

In operation, exhaust gas discharged by the engine 1 flows under normal conditions through the exhaust pipe 7 into the reactor 15 where combustion of unburned emissions takes place with the release of heat into the reactor. The treated gases leave the reactor through tailpipe 19 to flow downstream to atmosphere, though if desired, additional silencing or emission treating units can be placed in the system. In the event that the temperature of the bed 45 in reactor 15 exceeds a predetermined value, the internal contacts of the switch 43 will close and electricity will flow through the circuit 31, provided, of course, that ignition switch 37 is closed. The explosive charge in plug 29 will therefore be detonated to destroy the plug and open by pass pipe 23 to atmosphere. Since the pipe 23 is located in the upstream side of the reactor 15, and presents less resistance to flow than the reactor and structure downstream therefrom, the exhaust gas will by pass the reactor and flow to atmosphere through the open end of the pipe 23. Obviously, this will terminate heat generation in the reactor and result in a lowering of its temperature. As soon as practicable, the vehicle operator will replace whatever parts are necessary so that normal and acceptable operation of the exhaust system 5 can again take place.

In the modification of FIG. 2, parts which are substantially the same as in FIG. 1 are given the same reference numerals. In this modification a by pass pipe 101 is welded around the opening 21 in the pipe 7 and empties at its bottom end 103 into a pipe section 105 to which it is welded. The explosive device 29 is fitted or threaded into one end 107 of the pipe section 105 while the other end 109 is closed by a weak wall device 111 that is mounted on the end of a bushing 113 projecting out of the pipe 105. The device 111 comprises a thin metal retainer 115 that holds the plug 117 in place and the plug may be attached by a wire 119 to a bracket 121 that extends from the pipe 105 so that on blow-out the plug will remain attached to the pipe 105.

In operation of the system of FIG. 2, excessive temperatures in the reactor 15 would cause closing of the switch 43 to detonate the explosive charge in the plug 29 and raise pressure inside of the pipe 105 which will fracture the weak retainer metal 115 and open up the end 109 of the pipe. The device 29 may also be blown out or it may be designed to remain in place. Exhaust gas can then by pass the reactor 15 and flow through the conduit 101 and the conduit 105.

The arrangement of FIG. 3 is similar to that of FIG. 2 but the weak wall device 111 is replaced by a device 211, the remaining parts being given the same reference numbers as in FIGS. 2 and 3. This device comprises an attachment flange 213 that is welded to the end of the pipe 105 and a mounting flange 215 that is secured by bolts 217 to the pad 213. Between the elements 213 and 215 is clamped a ring 219 which has a thin metal diaphragm 221 in the center thereof. In operation, pressure in pipe 105 that occurs on detonation of the device 29 will rupture the thin diaphragm 221 to permit gases to by pass the reactor 15.

In FIGS. 4 – 6, the by pass pipe 101' leads to a blow-out device 301 that empties into a chamber 305 that is connected by pipe 307 to the tailpipe 19. When the blow-out device 301 functions gas by passes reactor 15 but flows back into the exhaust system. It will be understood that the return flow provided by chamber 305 and pipe 307 may be eliminated, if desired, in which event the system will function to by pass directly to atmosphere as in the case of the systems of FIGS. 1- 3.

The device 301 comprises a housing 309 with an inlet bushing 311 that receives and is clamped to the end of pipe 101'. The outlet end of housing 309 is normally closed and sealed by an asbestos gasket 313 and tightly fitted end cap 315. The cap 315 is secured by nuts 317 to a threaded center rod 319 which at its inner end has an enlarged head 321 that slides tightly inside of actuator sleeve 323 that is closed by threaded cap 324 through which rod 319 passes. The explosive charge device 325 (corresponding to device 29) fits in the end of sleeve 323 and the sleeve itself is supported by a collar or bracket 327 that is positioned in housing 309. The housing 309 is grounded as illustrated at 329 and the conductor 331 connects the explosive device 325 to the shell posts 333 which is connected by conductor 335 to the thermal switch 45. The other side of switch 45 is connected by line 337 to the grounded battery 339, such line preferably including the ignition switch 341.

The chamber 305 is provided by a housing 343 which has a collar 345 to fit around housing 309. It has an outlet collar 347 for attachment to pipe 307. It is recognized that the chamber 305 will absorb acoustic energy and have a silencing effect on gas leaving the device 301.

In normal operation, gas pressure is insufficient to open tight cap 315 against the drag of head 321 in sleeve 323 and its own tight fit. When temperature in reactor 15 exceeds a predetermined degree, the switch 45 will close and, assuming the ignition switch 341 is also closed, current will detonate charge 325 to force the head 321 and rod 319 to the right to open the right end of housing 309, the cap 324 limiting movement. Gas then flows into chamber 305 and back into the exhaust system via pipe 307.

Modifications in the specific structures shown may be made without departing from the spirit and scope of the invention.

I claim:

1. A catalytic exhaust sytem for an internal combustion engine having a source of electrical power comprising a catalytic reactor having a catalyst bed, passage means connected to the engine for conducting gas from the engine through the reactor in operative relationship to the catalyst bed, said passage means including a by pass outlet upstream of the reactor, a thermal switch to sense the bed temperature, closure means for said by pass outlet, electrically actuated explosive means for opening the closure means to provide for bypass flow, and an electrical circuit energized by said source of electrical power and containing said thermal switch and explosive means, said switch closing said circuit when the temperature of said bed exceeds a predetermined upper value and thereby actuating said explosive means.

2. A system as set forth in claim 1 wherein said closure means comprises a conduit having a wall opened by the explosion of said explosive means.

3. A system as set forth in claim 1 wherein said closure means comprises a conduit having an outlet and a closure for said outlet, said closure being opened by the pressure of explosion of said explosive means.

4. A system as set forth in claim 3 including a return passage connected to said closure to return gas to the passage means on the downstream side of the reactor.

5. A system as set forth in claim 4 wherein said return passage includes a chamber to absorb acoustic energy in the gas.

6. A system as set forth in claim 1 wherein said closure means opens to atmosphere outside the exhaust system.

7. A system as set forth in claim 1 wherein said closure means includes a wall that ruptures to provide for by pass flow.

8. A system as set forth in claim 1 wherein said closure means includes a movable wall and means limiting the movement of the wall.

9. A system as set forth in claim 8 including an actuator connected to the wall and actuated by the explosion of the explosive means.

* * * * *